United States Patent
Xu et al.

(10) Patent No.: US 12,266,163 B2
(45) Date of Patent: Apr. 1, 2025

(54) OBJECT IDENTIFICATION METHOD, APPARATUS AND DEVICE

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 307 days.

(21) Appl. No.: 17/790,128

(22) PCT Filed: Dec. 4, 2020

(86) PCT No.: PCT/CN2020/134073
§ 371 (c)(1),
(2) Date: Jun. 30, 2022

(87) PCT Pub. No.: WO2021/135828
PCT Pub. Date: Jul. 8, 2021

(65) Prior Publication Data
US 2023/0042208 A1 Feb. 9, 2023

(30) Foreign Application Priority Data
Jan. 2, 2020 (CN) .......................... 202010002999.9

(51) Int. Cl.
*G06V 10/82* (2022.01)
*G06V 10/778* (2022.01)

(52) U.S. Cl.
CPC .......... *G06V 10/82* (2022.01); *G06V 10/7788* (2022.01)

(58) Field of Classification Search
CPC .... G06V 10/82; G06V 10/7788; G06V 20/00; G06F 18/214; G06F 18/24
(Continued)

(56) References Cited

U.S. PATENT DOCUMENTS 7,995,055 B1 * 8/2011 Ma ....................... G06V 10/761
382/154
10,719,301 B1 * 7/2020 Dasgupta ................. G06F 8/34
(Continued)

FOREIGN PATENT DOCUMENTS

CN  103714527  4/2014
CN  108520247  9/2018
(Continued)

OTHER PUBLICATIONS

"International Search Report (Form PCT/ISA/210) of PCT/CN2020/134073", mailed on Feb. 25, 2021, with English translation thereof, pp. 1-4.
(Continued)

*Primary Examiner* — Ali Bayat
(74) *Attorney, Agent, or Firm* — JCIPRNET

(57) ABSTRACT

Provided are an object identification method, apparatus, and device. The object identification method comprises: acquiring a first image of at least part of an object; determining a feature portion of the object on the basis of the first image; acquiring a second image of the feature portion of the object; and identifying an object category of the object on the basis of the second image. According to the object identification method, apparatus, and device, in which a feature portion of an object is acquired and identification of the category of the object is performed on the basis of the feature portion, operations are simple, and the accuracy of object identification can be effectively improved.

16 Claims, 4 Drawing Sheets

(58) Field of Classification Search
USPC .......................................................... 382/155
See application file for complete search history.

(56) References Cited

U.S. PATENT DOCUMENTS

| | | | |
|---|---|---|---|
| 2017/0091937 A1* | 3/2017 | Barnes | G06V 10/771 |
| 2017/0132019 A1* | 5/2017 | Karashchuk | G06Q 10/109 |
| 2017/0200063 A1 | 7/2017 | Nariyambut Murali et al. | |
| 2018/0276473 A1* | 9/2018 | Kim | G06V 10/235 |
| 2019/0171912 A1 | 6/2019 | Vallespi-Gonzalez et al. | |
| 2019/0286940 A1* | 9/2019 | Shen | G06T 11/60 |
| 2023/0195845 A1* | 6/2023 | Dasgupta | G06N 5/04 |
| | | | 706/12 |

FOREIGN PATENT DOCUMENTS

| | | |
|---|---|---|
| CN | 109697416 | 4/2019 |
| CN | 110263681 | 9/2019 |
| CN | 110378303 | 10/2019 |
| CN | 110490086 | 11/2019 |
| CN | 110536040 | 12/2019 |
| CN | 111242178 | 6/2020 |

OTHER PUBLICATIONS

"Written Opinion of the International Searching Authority (Form PCT/ISA/237) of PCT/CN2020/134073", mailed on Feb. 25, 2021, pp. 1-4.

"Office Action of China Counterpart Application", issued on Mar. 29, 2023, p. 1-p. 9.

"Office Action of China Counterpart Application", issued on Sep. 19, 2023, p. 1-p. 11.

"Office Action of China Counterpart Application", issued on Jan. 22, 2024, p. 1-p. 9.

"Decision of Rejection of China Counterpart Application", issued on Mar. 27, 2024, p. 1-p. 10.

* cited by examiner

OBJECT IDENTIFICATION METHOD, APPARATUS AND DEVICE

CROSS-REFERENCE TO RELATED APPLICATION

This application is a 371 of international application of PCT application serial no. PCT/CN2020/134073, filed on Dec. 4, 2020, which claims the priority benefits of China Patent Application No. 202010002999.9, filed on Jan. 2, 2020. The entirety of each of the above-mentioned patent applications is hereby incorporated by reference herein and made a part of this specification.

BACKGROUND

Technical Field

The present disclosure relates to the field of computer technologies, and in particular, to an object identification method, apparatus, and device.

Description of Related Art

The field of computer technology sees the need for identifying a variety of objects. However, in most cases, users need to search for and identify the category of the object by themselves through search engines, terminology dictionaries and other assistance tools according to the features of the object. Conducting search in this way is time-consuming and the results are not very accurate. In recent years, there have been applications in which category information of the object is obtained by taking an image of the object and then using the image as an input. However, due to the problems such as the scope of images captured by users might be too broad, lack of detailed information, not including key feature parts of objects and so on, object category identification that is performed directly based on captured images might lead to inaccurate results. Accordingly, there is a need for improving methods and apparatus for identifying category of objects.

SUMMARY

The disclosure provides an object identification method, which includes: acquiring a first image of at least part of the object; determining a feature portion of the object based on the first image; acquiring a second image of the feature portion of the object; and identifying an object category of the object based on the second image.

In an embodiment of the present disclosure, the step of determining the feature portion of the object includes: identifying a preliminary category of the object based on the first image; and determining the feature portion of the object based on the identified preliminary category of the object.

In an embodiment of the present disclosure, the step of obtaining the second image of the feature portion of the object includes: providing prompt information to the user, the prompt information instructing the user to input the second image of the feature portion of the object; and receiving the second image of the feature portion of the object.

In an embodiment of the present disclosure, the step of acquiring the second image of the feature portion of the object includes: determining whether the first image includes the feature portion of the object; and when the first image includes the feature portion of the object: cropping the first image to obtain the image of the feature portion as the second image, or in the case where the first image is a reduced-resolution image after down-sampling the third image, cropping the third image to obtain the image of the feature portion as the second image.

In an embodiment of the present disclosure, the step of determining whether the first image includes the feature portion of the object includes: identifying and labeling each part of the object in the first image through a pre-trained first object part identification model; and determining whether the first image includes the feature portion of the object based on the identification and labeling results.

In an embodiment of the present disclosure, the step of acquiring a second image of the feature portion of the object includes: determining whether the first image includes a complete image of the object; and in the case that the first image includes the complete image of the object: cropping the first image to obtain the image of the feature portion as the second image, or in the case where the first image is a reduced-resolution image after down-sampling the third image, cropping the third image to obtain the image of the feature portion as the second image.

In an embodiment of the present disclosure, the object is a plant, and the resolution of the second image is higher than that of the first image. The step of identifying the preliminary category of the object includes: acquiring and recording the one or more of location information and season information in acquisition of the first image, excluding impossible object categories based on the one or more of location information and season information; and in the case of excluding impossible object categories, identifying the preliminary category of the object.

In an embodiment of the present disclosure, the step of identifying the object category of the object includes identifying one or more of category information, location information, season information, time information, weather information, and capturing angle information associated with the object.

In an embodiment of the present disclosure, one or more of the first image and the second image are stored in a sample library corresponding to the object category of the object, and physiological cycle information and appearance information corresponding to the one or more of location information, season information, time information, weather information, and capturing angle information are recorded.

In an embodiment of the present disclosure, the step of providing the prompt information to the user includes: providing the prompt information to the user through one or more of text, graphics, and voice.

In an embodiment of the present disclosure, the preliminary category of the object is identified based on a pre-trained first object category identification model. The object category of the object is identified based on a pre-trained second object category identification model. The first object category identification model and the second object category identification model are the same or different. The object category identification model includes a deep convolutional neural network or a deep residual network.

In an embodiment of the present disclosure, the training step of the first and/or object category identification model includes: acquiring a training sample set, each sample in the training sample set is labeled with a corresponding category; acquiring a test sample set, each sample in the test sample set is labeled with a corresponding category, and the test sample set is different from the training sample set; training the object category identification model based on the training sample set; testing the object category identification model based on the test sample set; when the test result indicates that the identification accuracy rate of the object category identification model is less than a preset accuracy rate, increasing the number of samples in the training sample set for retraining; and when the test result indicates that the identification accuracy rate of the object category identification model is greater than or equal to the preset accuracy rate, completing the training.

The present disclosure provides an apparatus for object identification, which includes: an image acquisition module configured to acquire a first image of at least a portion of the object, and to acquire a second image of a feature portion of the object; a feature portion determining module configured to determine a feature portion of the object based on the first image; and an object category identification module configured to identify an object category of the object based on the second image of the feature portion of the object.

In an embodiment of the present disclosure, the step of determining the feature portion of the object includes: identifying a preliminary category of the object based on the first image; and determining the feature portion of the object based on the identified preliminary category of the object.

In an embodiment of the present disclosure, the step of obtaining the second image of the feature portion of the object includes: providing prompt information to the user, the prompt information instructing the user to input the second image of the feature portion of the object; and receiving the second image of the feature portion of the object.

In an embodiment of the present disclosure, the step of acquiring the second image of the feature portion of the object includes: determining whether the first image includes the feature portion of the object; and when the first image includes the feature portion of the object: cropping the first image to obtain the image of the feature portion as the second image, or in the case where the first image is a reduced-resolution image after down-sampling the third image, cropping the third image to obtain the image of the feature portion as the second image.

In an embodiment of the present disclosure, the step of acquiring a second image of the feature portion of the object includes: determining whether the first image includes a complete image of the object; and in the case that the first image includes the complete image of the object: cropping the first image to obtain the image of the feature portion as the second image, or in the case where the first image is a reduced-resolution image after down-sampling the third image, cropping the third image to obtain the image of the feature portion as the second image.

The present disclosure provides a device for object identification, which includes: an image acquisition unit for acquiring an input image; a processor; and a memory configured to store a series of computer-executable instructions and a series of computer-accessible data associated with the series of computer-executable instructions, and the series of computer-executable instructions enable the processor to perform the method described in any embodiment in the present disclosure when being executed by the processor.

The present disclosure provides a computer-readable storage medium having computer-executable instructions stored therein, and the computer-executable instructions enable the processor to perform the method described in any embodiment in the present disclosure when being executed by the processor.

In the object identification method, apparatus and device provided by the disclosure, by acquiring the feature portion of the object and identifying the category of the object based on the feature portion, the operation is simple and the accuracy of the object identification may be effectively improved.

BRIEF DESCRIPTION OF THE DRAWINGS

In order to illustrate the technical solutions of the embodiments of the present disclosure more clearly, the accompanying drawings of the embodiments will be briefly introduced below. Clearly, the drawings in the following description only relate to some embodiments of the present disclosure, rather than limit the present disclosure.

DESCRIPTION OF THE EMBODIMENTS

Various exemplary embodiments of the present disclosure will be described in detail below with reference to the accompanying drawings. It should be noted that the relative arrangement of the components and steps, the numerical expressions and numerical values set forth in these embodiments do not limit the scope of the present disclosure unless specifically stated otherwise. In the following description, in order to better explain the present disclosure, numerous details are set forth, however it should be understood that the present disclosure may be implemented without these details.

The following description of various exemplary embodiments is merely illustrative, and those of ordinary skill in the art will understand that other variations, modifications, and alternatives are possible. In the present disclosure, the terms "first", "second", etc. are only used to distinguish between elements or steps, etc., and are not intended to denote chronological order, priority, or importance.

Techniques, methods, and apparatus known to those of ordinary skill in the art may not be discussed in detail herein, but where appropriate, such techniques, methods, and apparatus should be considered part of this specification.

The inventors of the present disclosure have intensively studied methods and systems for object identification. In order to simplify the description, plants are used as examples of objects in the following exemplary embodiments, but it should be construed that "objects" in the present disclosure include but are not limited to animals, people, scenery, natural objects, buildings, commodities, food, medicines, and/or daily necessities, etc.

Figure 1:
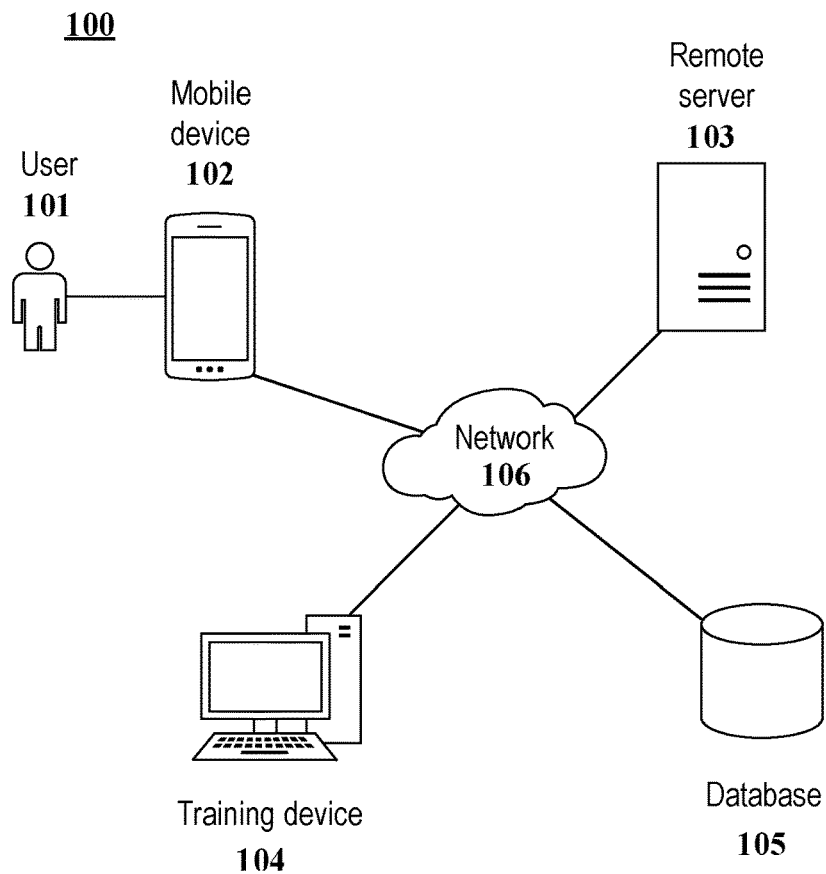
FIG. 1 shows a schematic view of a network environment of an object identification system according to an embodiment of the present disclosure.

FIG. 1 shows a schematic view of a network environment 100 of an object identification system according to an embodiment of the present disclosure.

The network environment 100 of the object identification system may include a mobile device 102, a remote server 103, a training device 104 and a database 105, which are wired or wirelessly coupled to each other through a network 106. The network 106 may be embodied as a wide area network (such as a mobile telephone network, public switched telephone network, satellite network, the Internet, etc.), a local area network (such as Wi-Fi, Wi-Max, Zig-Bee™ Bluetooth™, etc.), and/or other forms of networking capabilities.

The mobile device 102 may include mobile phones, tablet computers, laptop computers, personal digital assistants, and/or other computing devices configured to capture, store, and/or transmit images such as digital photographs. Accordingly, the mobile device 102 may include an image capturing device, such as a digital camera, and/or may be configured to receive images from other devices. The mobile device 102 may include a display. The display may be configured to provide the user 101 with one or more user interfaces, which may include a plurality of interface elements, and the user 101 may interact with the interface elements, and the like. For example, the user 101 may use the mobile device 102 to capture an object and upload or store the image of the object. The mobile device 102 may output category information and detailed description about the object to the user, or may output prompt information and the like to instruct the user to capture a specific part of the object.

The remote server 103 may be configured to analyze an image of the object or the like received from the mobile device 102 through the network 106 to determine the category of the object, and to provide information such as a detailed description of the corresponding object. The remote server 103 may further be configured to create and train an object category identification model according to an embodiment of the present disclosure. The specific training process of the object category identification model will be described below in conjunction with specific embodiments.

The training device 104 may be coupled to the network 106 to facilitate training of the object category identification model. The training device 104 may have multiple CPUs and/or Graphic Processing Units (GPUs) to assist in training the object category identification model.

The database 105 may be coupled to the network 106 and provide the data needed by the remote server 103 to perform related calculations. For example, the database 105 may include a sample library that stores images of a large number of objects of different categories. In an embodiment, taking plants as an example, the sample library may include a large number of image samples of different categories of plants in different locations, different seasons, different weathers at different times, and different capturing angles. In an embodiment, the selected plant photos captured by the user may also be stored in a sample library corresponding to the plant category. Meanwhile, physiological cycle information and appearance information corresponding to one or more of the location information, season information, time information, weather information and capturing angle information of the plant may also be recorded in the database. The database may be implemented using various database techniques known in the art. The remote server 103 may access the database 105 for relevant operations as needed.

It should be understood that the network environment 100 herein is merely an example. Those skilled in the art may add more devices or delete some devices as needed, and may modify the functions and configurations of some devices. In the following, description will be given by taking the object to be identified as a plant as an example.

The object identification method 200 according to an embodiment of the present disclosure is described below with reference to FIG. 2.

Figure 2:
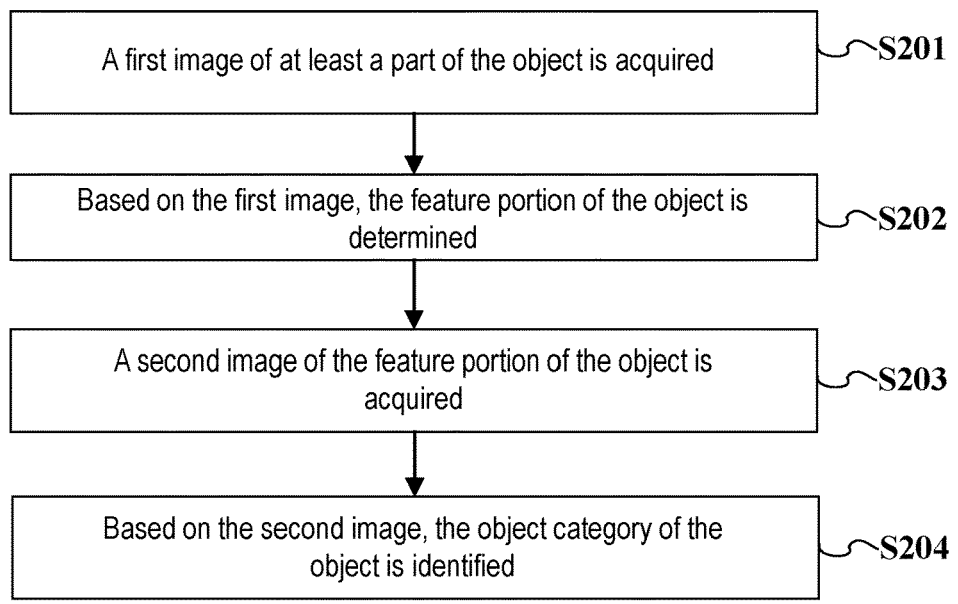
FIG. 2 shows a flowchart of an object identification method according to an embodiment of the present disclosure.

FIG. 2 shows a flowchart of an object identification method 200 according to an embodiment of the present disclosure. As shown in FIG. 2, in step S201, a first image of at least a part of the object is acquired.

As mentioned above, the first image may be previously stored by the user or captured by the user in real time. For example, the first image may be previously stored by the user in the mobile device 102 or captured in real time by the user using an external camera connected to the mobile device 102 or a camera built into the mobile device 102. In an embodiment, the user may also acquire the first image in real time through the network. In an embodiment, the first image may also be a reduced-resolution image obtained by down-sampling an original image previously stored by the user or an original image captured or acquired by the user in real time. After down-sampling processing, the amount of data processing may be reduced, thereby improving the computational efficiency of subsequent feature portion determining step and category identification step.

In step S202, based on the first image, the feature portion of the object is determined.

In an embodiment of the present disclosure, a feature portion of an object may be one or more key parts that can be used to clearly identify the category of the object. Objects of a category may have one or more feature portions. For example, for a flower plant, the feature portion thereof may be its petal portion and/or its flower stem portion.

In an embodiment, the step of determining the feature portion of the object may include: identifying a preliminary category of the object based on the first image; and determining the feature portion of the object based on the identified preliminary category of the object. In an embodiment, taking the object to be identified as a plant as an example, the step of identifying the preliminary category of the object may further include: acquiring and recording one or more of the location information and season information in the acquisition of the first image, excluding impossible object categories according to the one or more of location information and season information; and in the case of excluding impossible object categories, identifying a preliminary category of the object. For example, the possibility that the plant is a palm tree may be ruled out according to the location where the user captures the first image of a plant in real time in Northeast China, because in China palm trees are usually only distributed in areas south of the Qinling Mountains except Tibet. For example, the possibility that the plant is a pear flower may be ruled out according to the fact that the season when the user captures a photo of a certain plant in real time is in winter, because the pear flower usually only blooms in spring.

Figure 3:
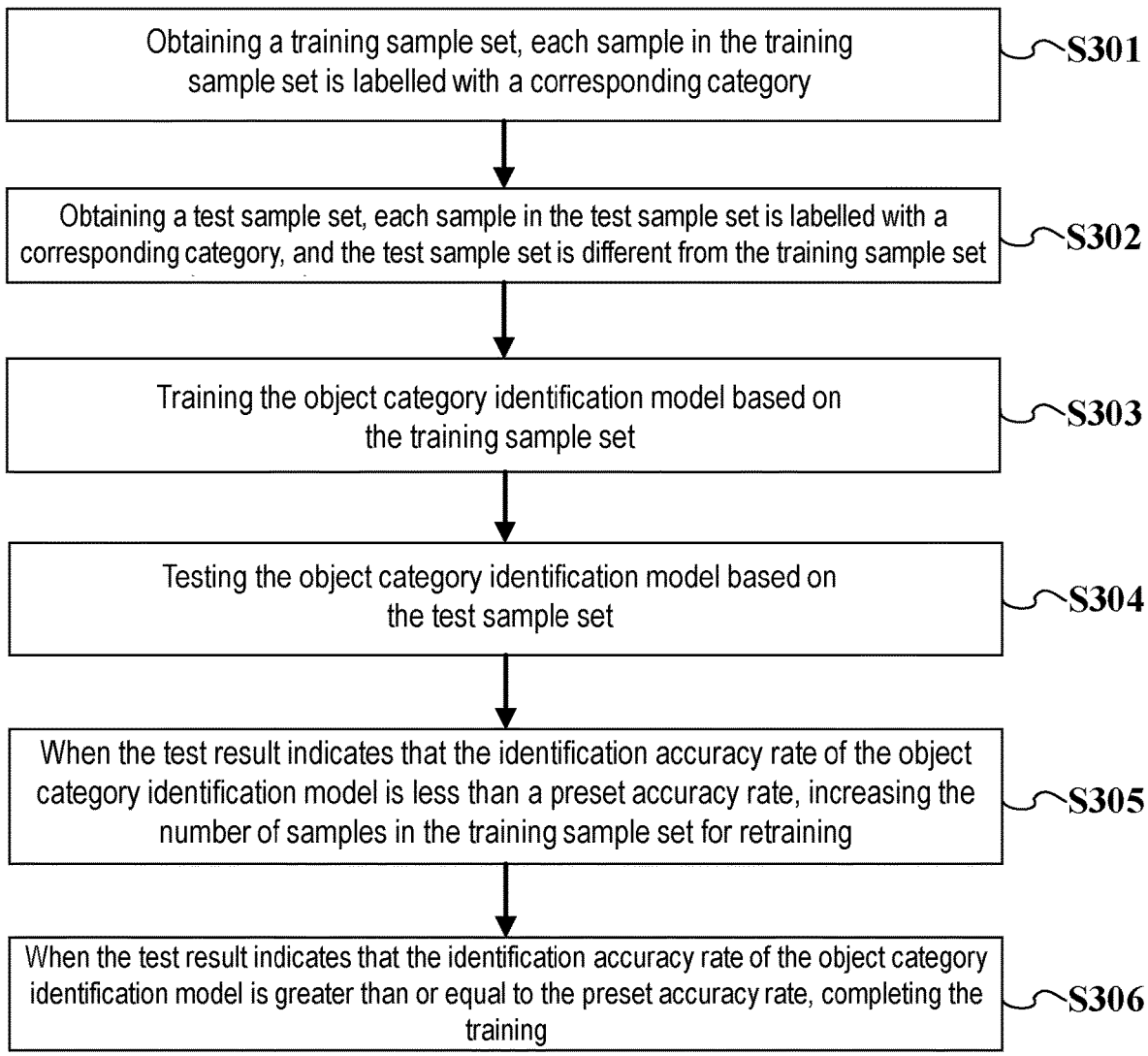
FIG. 3 shows a flowchart of a training method for an object category identification model according to an embodiment of the present disclosure.

In an embodiment, a preliminary category of an object may be identified through a pre-trained first object category identification model based on the first image. FIG. 3 shows a flowchart of a training method 300 of an object category identification model according to an embodiment of the present disclosure. As shown in FIG. 3, the training steps of the first object category identification model may include: step S301, obtaining a training sample set, each sample in the training sample set is labelled with a corresponding category; step S302, obtaining a test sample set, each sample in the test sample set is labelled with a corresponding category, and the test sample set is different from the training sample set; step S303, training the first object category identification model based on the training sample set; step S304, testing the first object category identification model based on the test sample set; step S305, when the test result indicates that the identification accuracy rate of the first object category identification model is less than a preset accuracy rate, increasing the number of samples in the training sample set for retraining; and step S306, when the test result indicates that the identification accuracy rate of the first object category identification model is greater than or equal to the preset accuracy rate, completing the training.

For example, a certain number of image samples labelled with corresponding information are obtained for each plant category, and the number of image samples prepared for each plant category may be the same or different. The corresponding information labelled for each image sample may include the plant category in the image sample (including scientific name, alias, category name of botanical classification, etc.). The image sample obtained for each plant category may include, as many as possible, images of the plants in the category that are captured at different capturing angles, in different lighting conditions, different weathers (for example, the same plant may have different appearances in sunny and rainy days), different seasons (for example, the same plant may have different appearances in different seasons), at different times (for example, the same plant may have different appearances in the morning and at night), in different growth environments (for example, the same plant may grow differently indoors and outdoors), and in different geographical locations (for example, the same plant may grow differently in different geographic locations). In these cases, the corresponding information labelled for each image sample may further include information such as capturing angle, illumination, weather, season, time, growth environment, or geographic location of the image sample.

The image samples subjected to the above labeling process may be classified into a training sample set for training the first object category identification model and a test sample set for testing the training results. Normally the number of samples in the training sample set is significantly greater than the number of samples in the test sample set. For example, the number of samples in the test sample set may account for 5% to 20% of the total number of image samples, while the number of samples in the corresponding training sample set may account for 80% to 95% of the total image samples. It should be understood by those skilled in the art that the number of samples in the training sample set and the testing sample set may be adjusted as required.

The first object category identification model may be trained using the training sample set, and the identification accuracy rate of the trained first object category identification model may be tested using the test sample set. If the identification accuracy rate does not meet the requirements, the number of image samples in the training sample set is increased, and the updated training sample set is used to retrain the first object category identification model until the identification accuracy rate of the trained first object category identification model meets the requirement. If the identification accuracy rate meets the requirements, the training ends. In an embodiment, whether the training can be ended may be determined based on whether the identification accuracy rate is less than the preset accuracy rate. In this way, the trained first object category identification model whose output accuracy rate meets the requirements may be used for object category identification.

In an embodiment, the first object category identification model may be a deep convolutional neural network (CNN) or a deep residual network (Resnet). Among them, the deep convolutional neural network is a deep feed-forward neural network, which uses a convolution kernel to scan the plant image, extracts the features to be identified in the plant image, and then identifies the features of the plant to be identified. In addition, in the process of identifying plant images, the original plant images may be directly input into the deep convolutional neural network model without pre-processing the plant images. Compared with other identification models, the deep convolutional neural network model has higher identification accuracy rate and identification efficiency. Compared with the deep convolutional neural network model, the deep residual network model is added with an identity mapping layer, which may avoid the saturation and even decline of accuracy rate caused by the convolutional neural network as the network depth (the number of layers in the network) increases. The identity mapping function of the identity mapping layer in the residual network model needs to satisfy: the sum of the identity mapping function and the input of the residual network model is equal to the output of the residual network model. After the identity mapping is introduced, the changes of output by the residual network model is more distinguishable, so that the identification accuracy rate and identification efficiency of plant physiological period identification may be significantly improved, thereby improving the identification accuracy rate and identification efficiency of plants.

It should be noted that the concepts of the present disclosure may also be implemented using other known or future developed training and identification models.

Still taking the object to be identified as a plant as an example, in an embodiment, the step of identifying the preliminary category of the object based on the first image may include: identifying the genus information of the object. For example, after the above-mentioned preliminary category identification processing of the object, it is possible to only identify the genus information of the object (for example, peach, cherry or rose, etc.), but the species information of plant (that is, precise category of plant) cannot be accurately identified. For example, the object is only identified as belonging to the genus Peach, but it is not possible to determine which peach species that the object belongs to. In this embodiment, the feature portion of the object may be determined based on the pre-established correspondence between the genus of the plant and a corresponding feature portion thereof. For example, for peach plants, it is possible to make further judgment based on the parts or features of its fruit, petal shape, calyx, overall shape (for example, whether the plant is a tree or a shrub), whether branches are hairy, or whether there are hairs on the front and back of leaves, so as to further determine the precise category of the peach plant. For cherry plants, it is possible to make further judgment based on the parts or features of whether the calyx is reflexed, whether the calyx is hairy, the length of the sepal and the calyx tube, the overall shape of the inflorescence, the bracts, the overall shape of the leaf, whether both sides of the leaf are hairless, whether the leaf edge is serrated, shape of petal top and shape of stipule, so as to further determine the precise category of the cherry plant. For rose plants, it is possible to make further judgment based on the parts or features of whether the calyx is reflexed, whether the calyx is hairy, the length of the sepal and the calyx tube, the overall shape of the inflorescence, the bracts, the overall shape of the leaf, whether both sides of the leaf are hairless, whether the leaf edge is serrated, shape of petal top, shape of stipule, and whether the flower stem has thorns or the shape of thorns, so as to further determine the precise category of the rose plant. Based on the above, the feature portions corresponding to the peach plant that may be pre-established include: one or more of fruit, petal, calyx, whole plant, branch and leaf parts of the plant, etc.; the feature portions corresponding to the cherry plant that may be pre-established include: one or more of calyx, sepals, calyx tubes, petals, bracts and leaf parts of the plant, etc.; the feature portions corresponding to rose plant that may be pre-established include: one or more of calyx, sepals, calyx tubes, petals, bracts slices, leaves and stem parts of the plant, etc., as shown in Table 1.

TABLE 1

Genus of object-feature portion correspondence table

| Genus | Feature portion |
|---|---|
| Peach | fruit, petal, calyx, whole plant, branch, leaves |
| Cherry | calyx, sepals, calyx tubes, petals, bracts, leaves |
| Rose | calyx, sepals, calyx tubes, petals, bracts slices, leaves, stem |
| . . . | . . . |

In another embodiment, for example, in the case where the genus information of the object cannot be identified after preliminary identification processing, or in the case where the corresponding relationship between the genus information of the preliminary identified object and its feature portion has not been established in advance, other methods may be adopted to determine the feature portion of the object. For example, for a plant object, division may be made based on the botanical parts, and one or more of its roots, stems, leaves, flowers, and fruit parts may be used as its feature portion. In an embodiment, the flower parts may be further subdivided into multiple parts such as the front part of the petal, the reverse part of the petal, the side part of the petal, the edge part of the petal, and the pedicel part as the feature portions of the object. In an embodiment, the leaf part may be further subdivided into one or more parts such as the front part of the leaf, the reverse part of the leaf, the petiole part, and the edge part of the leaf as the feature portions of the object.

In step S203, a second image of the feature portion of the object is acquired.

In an embodiment, the step of acquiring the second image of the feature portion of the object may include: providing prompt information to the user, the prompt information instructing the user to input the second image of the feature portion of the object; and receiving the second image of the feature portion of the object. In an embodiment, the second image has a higher resolution than the first image. For example, if the preliminary category of the object is identified as peach blossoms according to the above-described embodiment (i.e., the plant is preliminarily identified as belonging to the genus Peach), the system may output to the user the prompt information through, for example, an interactive interface of the mobile device 102, instructing the user to input the second image of the petal portion (i.e., the feature portion corresponding to the peach plant) of the object. Then, the system may receive the image captured by the user again according to the prompt information, and use the captured image as the second image of the feature portion of the object. In an embodiment, the prompt information may be provided to the user through one or more of text, graphics and voice.

In an embodiment, the step of acquiring the second image of the feature portion of the object may include: determining whether the first image includes the feature portion of the object; and in the case that the first image includes the feature portion of the object: cropping the first image to obtain the image of the feature portion as the second image, or in the case that the first image is a reduced-resolution image obtained by down-sampling the third image, cropping the third image to obtain the image of the feature portion as the second image.

Specifically, whether the first image includes a feature portion (e.g., a petal portion) of an object (e.g., a peach blossom) may be determined through various identification or matching algorithms. In an embodiment, the corresponding region where the feature portion is located in the first image may be searched and positioned according to a first object part identification model established by pre-training, so as to perform subsequent cropping processing. The first object part identification model may be a deep convolutional neural network (CNN) or a deep residual network (Resnet), which may be pre-trained based on a large number of complete images of different objects and images of various parts of different objects. In this embodiment, each part of the object in the first image may be identified and labelled by using the first object part identification model. For example, for a flower object, the first object part identification model may be used to identify and label different parts of the flower object respectively, such as leaf parts, petal parts or flower stem parts. Next, the predetermined feature portion of the object (for example, the petal part) is adopted to position and determine whether the first image includes the feature portion of the object. Still taking the above-mentioned embodiment about peach blossom identification as an example, in the case where it is determined that the first image includes the petal part of the object, the first image may be cropped to obtain the image of the petal part as the second image. In an embodiment, the first image may include petal parts, stem parts, leaf parts and some other picture background elements of the object, in which case, it is possible to crop and extract the petal parts only as the second image. In an embodiment, the first image may include only the petal parts of the object, but may include multiple petals, for example, the first image is a peach flower, which includes five petals in total, in which case, it is possible to crop and extract one of the petals only as the second image. In an embodiment, the first image may be a reduced-resolution image obtained by performing down-sampling processing on the original image captured by the user. In this case, the original image corresponding to the first image may also be cropped to obtain the image of the petal portion as the second image. Cropping the original image may preserve the original information of the object to a greater extent, thereby improving the identification accuracy. In the case where it is determined that the first image does not include the petal part of the object, prompt information may be provided to the user as described above, and an image captured again by the user may be received as the second image for subsequent processing, which will not be repeated here.

In an embodiment, the step of acquiring the second image of the feature portion of the object includes: determining whether the first image includes a complete image of the object; and in the case where the first image includes the complete image of the object: cropping the first image to obtain the image of the feature portion as the second image, or in the case that the first image is a reduced-resolution image obtained by down-sampling the third image, cropping the third image to obtain the image of the feature portion as the second image.

According to an embodiment of the present disclosure, it may be determined whether the first image includes a complete image of the object through a pre-trained second object part identification model. In an embodiment, each part of the object in the first image may be identified and labelled by using the second object part identification model. For example, for a flower-type object, the second object part identification model may be used to identify and label different parts of the flower-type object respectively, such as leaf parts, petal parts or flower stem parts. Then, whether the first image includes a complete image of the object may be determined based on a predetermined rule. In an embodiment, the predetermined rule may be: whether the identified and labelled parts include all the predetermined parts of the object. For example, for a flower-type object, all the predetermined parts may be leaf parts, petal parts and flower stem parts. In this case, only when the identified and labelled parts include leaf parts, petal parts and flower stem parts, it is then determined that the first image includes the complete image of the object. In another embodiment, the predetermined rule may be: the number of identified and labelled parts is greater than or equal to a predetermined threshold. For example, also for a flower-type object, the predetermined threshold may be 3. In this case, only when the number of identified and labelled parts is greater than or equal to 3 (for example, including leaf parts, petal parts and flower stem parts), it is then determined that the first image includes the complete image of the object. It should be understood that whether the first image includes a complete image of the object may also be determined based on any other predetermined rule. The second object part identification model may be a deep convolutional neural network (CNN) or a deep residual network (Resnet). In an embodiment, the second object part identification model may be trained based on a large number of complete images of different objects and images of various parts of different objects. The second object part identification model and the first object part identification model may be the same model or different models. Similar to the above description, in the case where it is determined that the first image includes the complete image of the object, the first image or the original image corresponding to the first image may be cropped to obtain the image of the feature portion as the second image; in the case where it is determined that the first image does not include the complete image of the object, prompt information may be provided to the user as described above, and an image captured again by the user may be received as the second image for subsequent processing, which will not be repeated here.

Finally, in step S204, based on the second image, the object category of the object is identified.

In an embodiment, a pre-trained second object category identification model may be used to identify the object category of the object. The second object category identification model and the first object category identification model may be the same model or different models. For example, the second object category identification model may be a deep convolutional neural network (CNN) or a deep residual network (Resnet). In an embodiment, the second object category identification model may also be trained using the training method 300 shown in FIG. 3. Compared with the above-mentioned preliminary classification of objects based on the first image identification, in step S204, since the second image may have an image resolution greater than or equal to the first image, and may include the feature portion of the object more specifically than the first image, the identification result in step S204 may be made more accurate. In an embodiment, since objects of the same category might grow differently in different geographic locations (e.g., grown in the south or north), in different seasons (e.g., in spring or in fall), at different times (e.g., in the morning or evening), under different weathers (e.g., sunny or rainy days) and at different capturing angles, in addition to identifying the category information of the object, identifying the object category of the object may further include identifying one or more of the location information, season information, time information, weather information, and capturing angle information associated with the object. For example, the category of the plant in the image may be identified as sunflower according to the image captured by the user, and the plant may also be identified as a sunflower on a sunny day based on its upright and slightly tilted flower disc (the sunflower flower disc on a cloudy day is normally slightly lower). For example, the category of plant in the image may be identified as ginkgo tree according to the image captured by the user, and the plant may also be identified based on the color of its leaves that the ginkgo tree is currently captured in autumn (ginkgo leaves turn yellow in autumn).

In addition, the original image captured by the user, the first image after the original image is compressed and down-sampled, or the obtained second image of the feature portion of the object may be stored in the sample library corresponding to the object category of the object, and physiological cycle information and appearance information corresponding to one or more of location information, season information, time information, weather information, and capturing angle information of the object are recorded.

Figure 4:
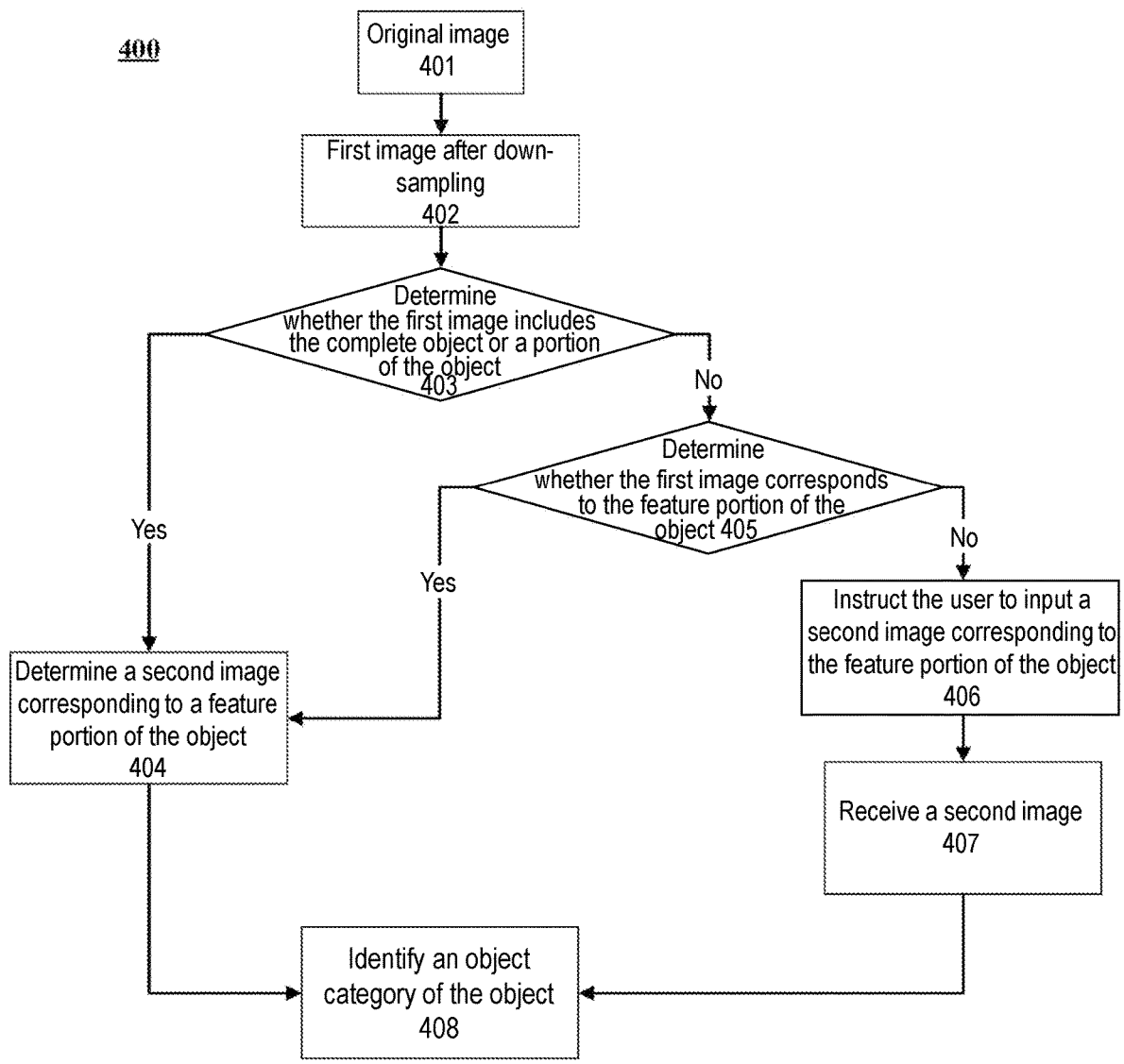
FIG. 4 shows a flowchart of an object identification method according to another embodiment of the present disclosure.

FIG. 4 shows a flowchart of an object identification method 400 according to another embodiment of the present disclosure.

According to the embodiment shown in FIG. 4, first, at 401, an original image of the object may be acquired. At 402, the original image of the object may be down-sampled to obtain a first image with reduced resolution. Then, at 403, it may be determined whether the first image includes the complete object or a portion of the object based on the pre-trained second object part identification model described above. If it is determined that the first image contains the complete object, the process proceeds to 404. At 404, a second image corresponding to a feature portion of the object may be cropped and extracted from the first image containing the complete object or a corresponding original image. If it is determined at 403 that the first image contains only a portion of the object, the process proceeds to 405. At 405, it may be further determined whether the first image containing only a part of the object corresponds to the feature portion of the object, if so, the process proceeds to 404 to perform corresponding processing; if not, the process proceeds to 406. At 406, prompt information may be output to the user, the prompt information instructing the user to input a second image of the feature portion of the object. Next, at 407, a second image may be received based on the user's input. After acquiring the second image corresponding to the feature portion of the object at 404 or 407, the process may proceed to 408. Finally, at 408, an object category of the object may be identified based on the second image, e.g., as may be implemented by a pre-trained object category identification model as described above.

Figure 5:
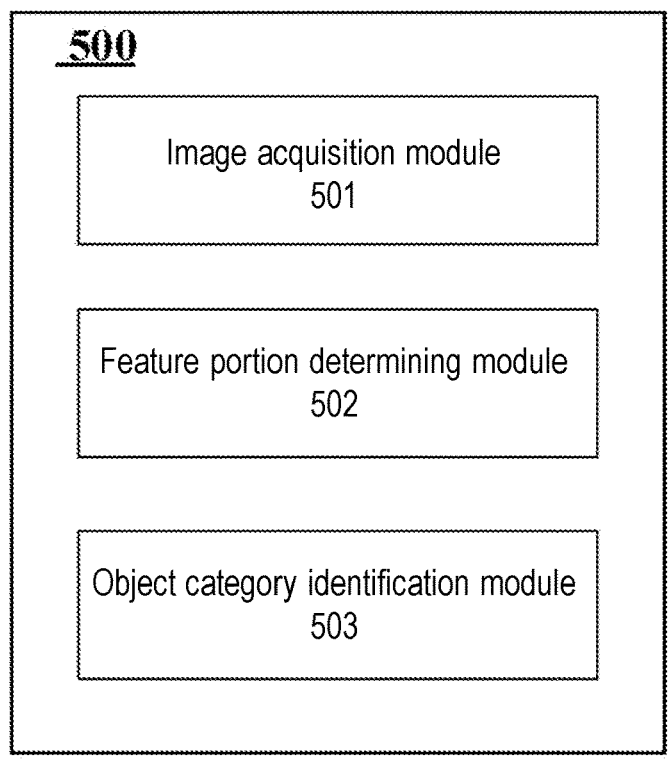
FIG. 5 shows a schematic view of an object identification apparatus according to an embodiment of the present disclosure.

FIG. 5 shows a schematic view of an object identification apparatus 500 according to an embodiment of the present disclosure.

The object identification apparatus 500 according to an embodiment of the present disclosure may include: an image acquisition module 501, a feature portion determining module 502, and an object category identification module 503. The image acquisition module 501 is configured to acquire a first image of at least a portion of the object, and to acquire a second image of a feature portion of the object; the feature portion determining module 502 is configured to determine a feature portion of the object based on the first image; and the object category identification module 503 is configured to identify the object category of the object based on the second image of the feature portion of the object.

In an embodiment, the step of determining the feature portion of the object may include: identifying a preliminary category of the object based on the first image; and determining the feature portion of the object based on the identified preliminary category of the object.

In an embodiment, the step of acquiring the second image of the feature portion of the object may include: providing prompt information to the user, the prompt information instructing the user to input the second image of the feature portion of the object; and receiving the second image of the feature portion of the object.

In an embodiment, the step of obtaining the second image of the feature portion of the object may include: determining whether the first image includes the feature portion of the object; and in the case that the first image includes the feature portion of the object, cropping the first image to obtain the image of the feature portion as the second image, or in the case that the first image is a reduced-resolution image obtained by down-sampling the third image, cropping the third image to obtain the image of the feature portion as the second image.

In an embodiment, the step of acquiring the second image of the feature portion of the object may include: determining whether the first image includes the complete image of the object; and in the case that the first image includes the complete image of the object, cropping the first image to obtain the image of the feature portion as the second image, or in the case that the first image is a reduced-resolution image obtained by down-sampling the third image, cropping the third image to obtain the image of the feature portion as the second image.

Figure 6:
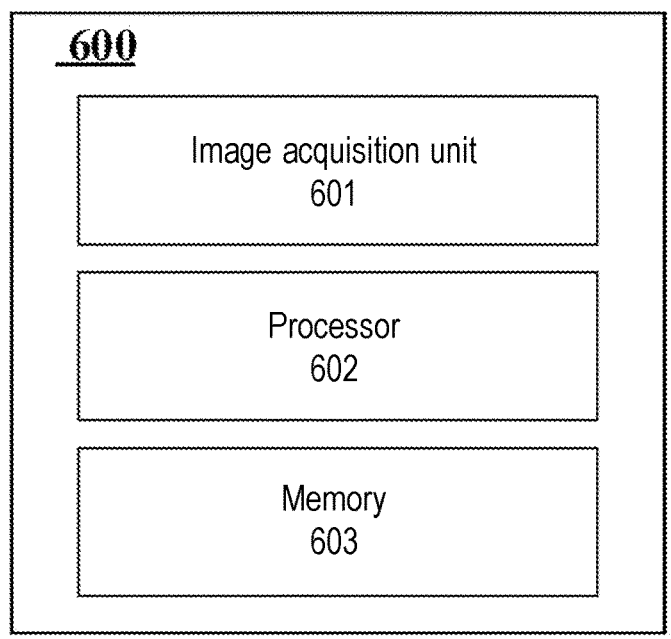
FIG. 6 shows a schematic view of an object identification device according to an embodiment of the present disclosure.

FIG. 6 shows a schematic view of an object identification device 600 according to an embodiment of the present disclosure.

As shown in FIG. 6, the object identification device 600 according to an embodiment of the present disclosure may include: an image acquisition unit 601, a processor 602 and a memory 603.

The image acquisition unit 601 may be any image receiving unit capable of acquiring various forms of input images. The image acquisition unit 601 may acquire previously stored images, images captured by the user in real time, or may acquire images in real time directly through the network.

The processor 602 may perform various actions and processes according to programs stored in the memory 603. Specifically, the processor 602 may be an integrated circuit chip with signal processing capability. The aforementioned processors may be general-purpose processors, digital signal processors (DSPs), application specific integrated circuits (ASICs), off-the-shelf programmable gate arrays (FPGAs) or other programmable logic devices, discrete gate or transistor logic devices, discrete hardware components. Various methods, steps and logic block diagrams disclosed in the embodiments of the present disclosure may be implemented or executed. The general-purpose processor may be a microprocessor or the processor may also be any conventional processor, etc., and may be an X86 architecture or an ARM architecture, or the like.

The memory 603 stores executable instruction codes, and the instruction codes implement the object identification method 200 or the object identification method 400 described above when being executed by the processor 602. The memory 603 may be volatile memory or nonvolatile memory, or may include both volatile memory and nonvolatile memory. Non-volatile memory may be read-only memory (ROM), programmable read-only memory (PROM), erasable programmable read-only memory (EPROM), electrically erasable programmable read-only memory (EEPROM), or flash memory. Volatile memory may be random access memory (RAM), which serves as an external cache. By way of example and not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM), and direct memory bus random access memory (DRRAM). It should be noted that the memory of the methods described herein is intended to include, but not be limited to, these and any other suitable types of memory.

The present disclosure further provides a computer-readable storage medium having computer-executable instructions stored thereon, the computer-executable instructions implement the object identification method 200 or the object identification method 400 described above when being executed by a processor. Similarly, the computer-readable storage medium in embodiments of the present disclosure may be volatile memory or non-volatile memory, or may include both volatile memory and non-volatile memory. It should be noted that computer-readable storage medium described herein are intended to include, but not be limited to, these and any other suitable types of memory.

The method, apparatus and device for object identification provided by the present disclosure are simple and easy to operate and may effectively improve the accuracy of object identification by acquiring the feature portion of the object and identifying the object category based on the feature portion.

It should be noted that the flowcharts and block diagrams in the accompanying drawings illustrate the architecture, functionality, and operation of possible implementations of systems, methods and computer program products according to various embodiments of the present disclosure. In this regard, each block in the flowchart or block diagrams may represent a module, segment, or portion of code that contains one or more executable instructions for implementing the specified logic function. It should also be noted that, in some alternative implementations, the functions labelled in the blocks may occur differently from the order noted in the figures. For example, two blocks shown in succession may, in fact, be executed substantially concurrently, or the blocks may sometimes be executed in a reverse order, depending upon the functionality involved. It should also be noted that each block of the block diagrams and/or flowchart illustrations, and combinations of blocks in the block diagrams and/or flowchart illustrations, may be implemented in specific hardware-based systems that perform the specified functions or operations, or may be implemented in a combination of special hardware and computer instructions.

In general, the various exemplary embodiments of the present disclosure may be implemented in hardware or special-purpose circuits, software, firmware, logic, or any combination thereof. Certain aspects may be implemented in hardware, while other aspects may be implemented in firmware or software that may be executed by a controller, microprocessor or other computing device. While aspects of the embodiments of the present disclosure are illustrated or described as block diagrams, flowcharts, or represented by some other graphics, it is to be understood that the blocks, apparatus, systems, techniques, or methods described herein may be taken as non-limiting examples implemented in hardware, software, firmware, special-purpose circuits or logic, general-purpose hardware or controllers or other computing devices, or some combination thereof.

The exemplary embodiments of the present disclosure described in detail above are illustrative only and not restrictive. It should be understood by those skilled in the art that various modifications and combinations of these embodiments or features thereof may be made without departing from the principles and spirit of the disclosure, and such modifications should fall within the scope of the disclosure.

What is claimed is:

1. An object identification method, comprising:
    acquiring a first image of at least a portion of an object;
    determining a feature portion of the object based on the first image;
    acquiring a second image of the feature portion of the object; and
    identifying an object category of the object based on the second image;
    wherein the step of determining the feature portion of the object comprises:
    identifying a preliminary category of the object based on the first image; and
    determining the feature portion of the object based on the preliminary category of the object, which is identified;
    wherein the object is a plant, and a resolution of the second image is higher than a resolution of the first image,
    wherein the step of identifying the preliminary category of the object comprises:
    acquiring and recording location information and/or season information in acquisition of the first image, based on the one or more object categories that exclude impossible in the location information and the season information; and
    in the case of excluding the object categories that are impossible, identifying the preliminary category of the object.

2. The method according to claim 1, wherein the step of acquiring the second image of the feature portion of the object comprises:
    providing prompt information to a user, the prompt information instructing the user to input the second image of the feature portion of the object; and
    receiving the second image of the feature portion of the object.

3. The method according to claim 2, wherein the step of providing the prompt information to the user comprises: providing the prompt information to the user through text, graphics, and/or voice.

4. The method according to claim 1, wherein the step of acquiring the second image of the feature portion of the object comprises:
    determining whether the first image comprises a complete image of the object; and
    in the case that the first image comprises the complete image of the object:
    cropping the first image to obtain an image of the feature portion as the second image, or
    in the case where the first image is a reduced-resolution image after down-sampling a third image, cropping the third image to obtain the image of the feature portion as the second image.

5. The method according to claim 1, wherein the step of identifying the object category of the object comprises identifying one or more information of category information, the location information, the season information, time information, weather information, and capturing angle information associated with the object.

6. The method according to claim 5, wherein the first image and/or the second image are stored in a sample library corresponding to the object category of the object, and physiological cycle information and appearance information corresponding to the one or more information the location information, the season information, the time information, the weather information, and the capturing angle information are recorded.

7. The method according to claim 1, wherein the preliminary category of the object is identified based on a first object category identification model, which is pre-trained; the object category of the object is identified based on a second object category identification model, which is pre-trained, wherein
    the first object category identification model and the second object category identification model are the same or different;
    the first object category identification model comprises a deep convolutional neural network or a deep residual network, and
    the second object category identification model comprises the deep convolutional neural network or the deep residual network.

8. The method according to claim 7, wherein a step of pre-training the first object category identification model comprises:
    acquiring a training sample set, wherein each of samples in the training sample set is labeled with a corresponding category;
    acquiring a test sample set, wherein each of samples in the test sample set is labeled with a corresponding category, and the test sample set is different from the training sample set;
    training the first object category identification model based on the training sample set;
    testing the first object category identification model based on the test sample set;
    when a test result indicates that an identification accuracy rate of the first object category identification model is less than a preset accuracy rate, increasing the number of the samples in the training sample set for retraining; and
    when the test result indicates that the identification accuracy rate of the first object category identification model is greater than or equal to the preset accuracy rate, completing the training.

9. The method according to claim 7, wherein a step of pre-training the second object category identification model comprises:

acquiring a training sample set, wherein each of samples in the training sample set is labeled with a corresponding category;
acquiring a test sample set, wherein each of samples in the test sample set is labeled with a corresponding category, and the test sample set is different from the training sample set;
training the second object category identification model based on the training sample set;
testing the second object category identification model based on the test sample set;
when a test result indicates that an identification accuracy rate of the second object category identification model is less than a preset accuracy rate, increasing the number of the samples in the training sample set for retraining; and
when the test result indicates that the identification accuracy rate of the second object category identification model is greater than or equal to the preset accuracy rate, completing the training.

10. The method according to claim 1, wherein the step of acquiring the second image of the feature portion of the object comprises:
determining whether the first image comprises the feature portion of the object; and
when the first image comprises the feature portion of the object:
cropping the first image to obtain an image of the feature portion as the second image, or
in the case where the first image is a reduced-resolution image after down-sampling a third image, cropping the third image to obtain the image of the feature portion as the second image.

11. The method according to claim 10, wherein the step of determining whether the first image comprises the feature portion of the object comprises:
identifying and labeling each part of the object in the first image through a pre-trained first object part identification model; and
determining whether the first image comprises the feature portion of the object based on an identification and labeling result.

12. An object identification apparatus, comprising:
an image acquisition circuit configured to acquire a first image of at least a portion of an object, and to acquire a second image of a feature portion of the object;
a processor configured to determine the feature portion of the object based on the first image and to identify an object category of the object based on the second image of the feature portion of the object;
wherein the step of determining the feature portion of the object comprises:
identifying a preliminary category of the object based on the first image; and
determining the feature portion of the object based on the preliminary category of the object, which is identified;
wherein the object is a plant, and a resolution of the second image is higher than a resolution of the first image,
wherein the step of identifying the preliminary category of the object comprises:
acquiring and recording location information and/or season information in acquisition of the first image, based on the one or more object categories that exclude impossible in the location information and the season information; and
in the case of excluding the object categories that are impossible, identifying the preliminary category of the object.

13. The apparatus according to claim 12, wherein the step of acquiring the second image of the feature portion of the object comprises:
providing prompt information to a user, the prompt information instructing the user to input the second image of the feature portion of the object; and
receiving the second image of the feature portion of the object.

14. The apparatus according to claim 12, wherein the step of acquiring the second image of the feature portion of the object comprises:
determining whether the first image comprises a complete image of the object; and
in the case that the first image comprises the complete image of the object:
cropping the first image to obtain an image of the feature portion as the second image, or
in the case where the first image is a reduced-resolution image after down-sampling a third image, cropping the third image to obtain the image of the feature portion as the second image.

15. The apparatus according to claim 12, wherein the step of acquiring the second image of the feature portion of the object comprises:
determining whether the first image comprises the feature portion of the object; and
in the case that the first image comprises the feature portion of the object:
cropping the first image to obtain an image of the feature portion as the second image, or
in the case where the first image is a reduced-resolution image after down-sampling a third image, cropping the third image to obtain the image of the feature portion as the second image.

16. An object identification device, comprising:
an image acquisition circuit for acquiring an input image;
a processor; and
a memory configured to store a series of computer-executable instructions and a series of computer-accessible data associated with the series of computer-executable instructions,
wherein the series of computer-executable instructions, when executed by the processor, enable the processor to:
acquire a first image of at least a portion of an object;
determine a feature portion of the object based on the first image;
acquire a second image of the feature portion of the object; and
identify an object category of the object based on the second image;
wherein the step of determining the feature portion of the object comprises:
identifying a preliminary category of the object based on the first image; and
determining the feature portion of the object based on the preliminary category of the object, which is identified;
wherein the object is a plant, and a resolution of the second image is higher than a resolution of the first image,
wherein the step of identifying the preliminary category of the object comprises:
acquiring and recording location information and/or season information in acquisition of the first image, based on the one or more object categories that exclude impossible in the location information and the season information; and in the case of excluding the object categories that are impossible, identifying the preliminary category of the object.

* * * * *